United States Patent
Paonessa et al.

[11] Patent Number: 6,135,181
[45] Date of Patent: Oct. 24, 2000

[54] TIRE WITH BEAD FILLER RUNFLAT INSERTS

[75] Inventors: Anthony Curtis Paonessa, Akron; Mark Henry Seloover, Clinton, both of Ohio; John Janes Beck, Jr., Lawton, Okla.; Thomas Reed Oare, Suffield; Joseph Ghana Dancy, North Canton, both of Ohio

[73] Assignee: The Goodyear Tire & Rubber Company, Akron, Ohio

[21] Appl. No.: 09/154,347

[22] Filed: Sep. 16, 1998

Related U.S. Application Data

[62] Division of application No. 08/865,490, May 29, 1997, Pat. No. 5,871,602.

[51] Int. Cl.$^7$ .............................. B60C 9/00; B60C 13/00; B60C 15/00; B60C 15/06; B60C 17/00
[52] U.S. Cl. .................. 152/458; 152/517; 152/541; 152/542; 152/546; 152/554; 152/555
[58] Field of Search ...................... 152/517, 540, 152/541, 546, 539, 542, 548, 554, 555, 458

[56] References Cited

U.S. PATENT DOCUMENTS

| | | |
|---|---|---|
| 3,062,258 | 11/1962 | Maiocchi . |
| 3,994,329 | 11/1976 | Masson et al. ........................ 152/517 |
| 4,202,393 | 5/1980 | Ikeda et al. . |
| 4,842,033 | 6/1989 | Nguyen . |
| 5,060,707 | 10/1991 | Sumikawa . |
| 5,198,050 | 3/1993 | Gifford . |
| 5,234,043 | 8/1993 | Suzuki et al. . |
| 5,238,040 | 8/1993 | Ghilardi . |
| 5,361,820 | 11/1994 | Adachi ................................ 152/554 X |
| 5,368,082 | 11/1994 | Oare et al. . |
| 5,392,830 | 2/1995 | Janello et al. . |
| 5,427,166 | 6/1995 | Willard, Jr. . |
| 5,511,599 | 4/1996 | Willard, Jr. . |
| 5,639,320 | 6/1997 | Oare et al. . |
| 5,795,416 | 8/1998 | Willard, Jr. et al. .................... 152/517 |

FOREIGN PATENT DOCUMENTS

| | | |
|---|---|---|
| 1126635 | 6/1982 | Canada . |
| 0535938 | 4/1993 | European Pat. Off. . |
| 0590482A1 | 6/1994 | European Pat. Off. . |
| 0613795A1 | 9/1994 | European Pat. Off. . |
| 2261888 | 9/1975 | France . |
| 2271947 | 12/1975 | France . |
| 58-174004 | 10/1983 | Japan . |
| 2033316 | 5/1980 | United Kingdom . |

Primary Examiner—Adrienne C. Johnstone
Attorney, Agent, or Firm—David L King

[57] ABSTRACT

A pneumatic tire (10) has a pair of sidewall portions (20), a pair of bead regions (22) and a carcass (30) reinforced with at least two sidewall fillers or inserts (42), (46) for each sidewall portion and at least one cord reinforced ply (38) and two bead cores (26) one in each bead region and a reinforcing belt structure (36). This tire is preferably a runflat radial ply tire. The at least one cord reinforced ply (38) has a pair of turnup ends (32) wrapped around the pair of bead cores (26). The turnup ends (32) each extend radially outwardly to a terminal end (33) at a radial height of at least 40% of the tire section height (SH). The first insert for each sidewall portion lies radially inward and adjacent the at least one ply (38). The second insert (46) for each sidewall portion is a bead filler insert radially above the bead core (26) and between the at least one ply (38) and its turnup end (32).

7 Claims, 9 Drawing Sheets

TIRE WITH BEAD FILLER RUNFLAT INSERTS

This is a division of application Ser. No. 08/865,490, filed May 29, 1997 now U.S. Pat. No. 5,871,602.

TECHNICAL FIELD

This invention relates to a tire; more particularly to a pneumatic tire capable of being used in the uninflated condition. The tire carcass structure can improve or at least equal ride performance of conventional tires without exhibiting the normal weight penalties associated with runflat type tires while being manufactured using fewer components.

BACKGROUND OF THE INVENTION

Various tire constructions have been suggested for pneumatic runflat tires, that is, tires capable of being used in the uninflated condition. One approach described in U.S. Pat. No. 4,111,249 entitled the "Banded Tire" was to provide a hoop or annular band directly under and approximately as wide as the tread. The hoop in combination with the rest of the tire structure could support the vehicle weight in the uninflated condition. This banded tire actually tensioned the ply cords even in the uninflated condition.

Another approach taken has been to simply strengthen the sidewalls by increasing the cross-sectional thickness thereof. These tires when operated in the uninflated condition place the ply cords and the sidewall in compression. Due to the large amounts of rubber required to stiffen the sidewall members, heat build-up is a major factor in tire failure. This is especially true when the tire is operated for prolonged periods at high speeds in the uninflated condition. Pirelli discloses such a tire in European Pat. Pub. No. 0-475-258A1.

A Goodyear patent having some of the same inventors of the present invention disclosed the first commercially accepted runflat pneumatic radial ply tire, the Eagle GSC-EMT tire. The tire was accepted as an equipment option for the 1994 Corvette automobile. U.S. Pat. No. 5,368,082 teaches the employment of special sidewall inserts to improve stiffness. Approximately six additional pounds of weight per tire was required to support an 800 lb load in this uninflated tire. These runflat tires had a very low aspect ratio. This earlier invention although superior to prior attempts still imposed a weight penalty per tire that could be offset by the elimination of a spare tire and the tire jack. This weight penalty was even more problematic when the engineers attempted to build higher aspect ratio tires for the large luxury touring sedans. The required supported weight for an uninflated luxury car tire approximates 1400 lbs load. These taller sidewalled tires having aspect ratios in the 55% to 65% range or greater means that the working loads were several times that of the earlier 40% aspect ratio runflat Corvette type tires. Such loads meant that the sidewalls and overall tire had to be stiffened to the point of compromising ride. Luxury vehicle owners simply will not sacrifice ride quality for runflat capability. The engineering requirements have been to provide a runflat tire with no loss in ride or performance. In the very stiff suspension performance type vehicle the ability to provide such a tire was comparatively easy when compared to luxury sedans with a softer ride characteristic. Light truck and sport utility vehicles, although not as sensitive to ride performance, provide a runflat tire market that ranges from accepting a stiffer ride to demanding the softer luxury type ride.

An equally important design consideration in the development of a runflat tire is insuring that the uninflated tire remains seated on the rim. Solutions have been developed employing bead restraining devices as well as special rims to accomplish this requirement such as Bridgestone Expedia S-01 Runflat A/M Tire. Alternatively, the Eagle GSC-EMT tire employed a new bead configuration enabling the tire to function on standard rims without requiring additional bead restraining devices.

Two U.S. Pat. Nos. 5,427,166 and 5,511,599 of Walter L Willard, Jr., show Michelin tires that disclose the addition of a third ply and an addition of a third insert in the sidewall to further increase the runflat performance of the tire over the original Oare et al. Patents. These patents discuss some of the load relations that occur in the uninflated condition of the tire and they demonstrate that the Oare concept can be applied to addition numbers of plies and inserts.

A latter runflat tire attempt is taught in U.S. Pat. No. 5,685,927 which provides a higher aspect ratio tire with the employment of a load supporting bead core placed directly under the tread belt package of the tire. Again, most of the inventors of that concept were part of the original design team of the original Corvette EM tire. Although very promising in load support and ride that approach showed somewhat higher rolling resistance in the normally inflated conditions.

A further latter U.S. Pat. No. 5,535,800 discloses the use of elastomeric covered composite ribs that in combination with a radial ply can provide excellent runflat capability in a wide range of tire applications.

In U.S. Pat. No. 5,361,820, a pneumatic radial tire is disclosed that has a shoulder insert and an apex enveloped by a single ply that has its turnup extended to end directly under the edge of the belt reinforcement. The tire although not a runflat tire demonstrates that beneficial weight reductions can be achieved with a nominal loss of high performance handling. The employment of such a structure in a runflat tire has not been applied successfully due to the unique design requirements.

The invention disclosed hereinafter has successfully demonstrated a unique way to achieve a runflat tire using a few as one ply and two inserts while still being able to keep the tire intact during runflat conditions. This enables the tire to be very efficiently produced with a lighter weight and fewer components.

SUMMARY OF THE INVENTION

A tire 10 has a tread, a belt reinforcing structure 36, a pair of substantially inextensible bead cores 26, and at least one ply 38 reinforced with cords 41, the at least one ply 38 has a pair of turnup ends 32 wrapped around the pair of inextensible bead cores 26 and extending radially outwardly to a terminal end 33 lying under the belt 36. In each sidewall structure the carcass has at least one insert 42 radially inward of the ply 38, and a second insert 46, the turnup end 32 being spaced from the first ply 38 by the second insert 46 in the sidewall 20.

In the preferred embodiment the first ply 38 has synthetic or textile cords of nylon, rayon or aramid.

The first and second inserts 42,46 preferably were elastomeric having a cross-sectional shape and material properties selected to enhance inflated ride performance while insuring runflat durability. The inserts 42,46 could also be reinforced with cords 41 or short fibers 82 or high modulus cords 43 of preferably steel.

In one embodiment the inventive tire has only the one insert 42 and a bead filler 48 the bead filler being radially above the bead core and interposed between the ply 38 and the turnup 32. The turnup 32 having an end 33 radially at a location of at least 40% of the section height of the tire.

The inventive concept can be applied to tires 10 having more plies and more inserts.

DEFINITIONS

Figure 1:
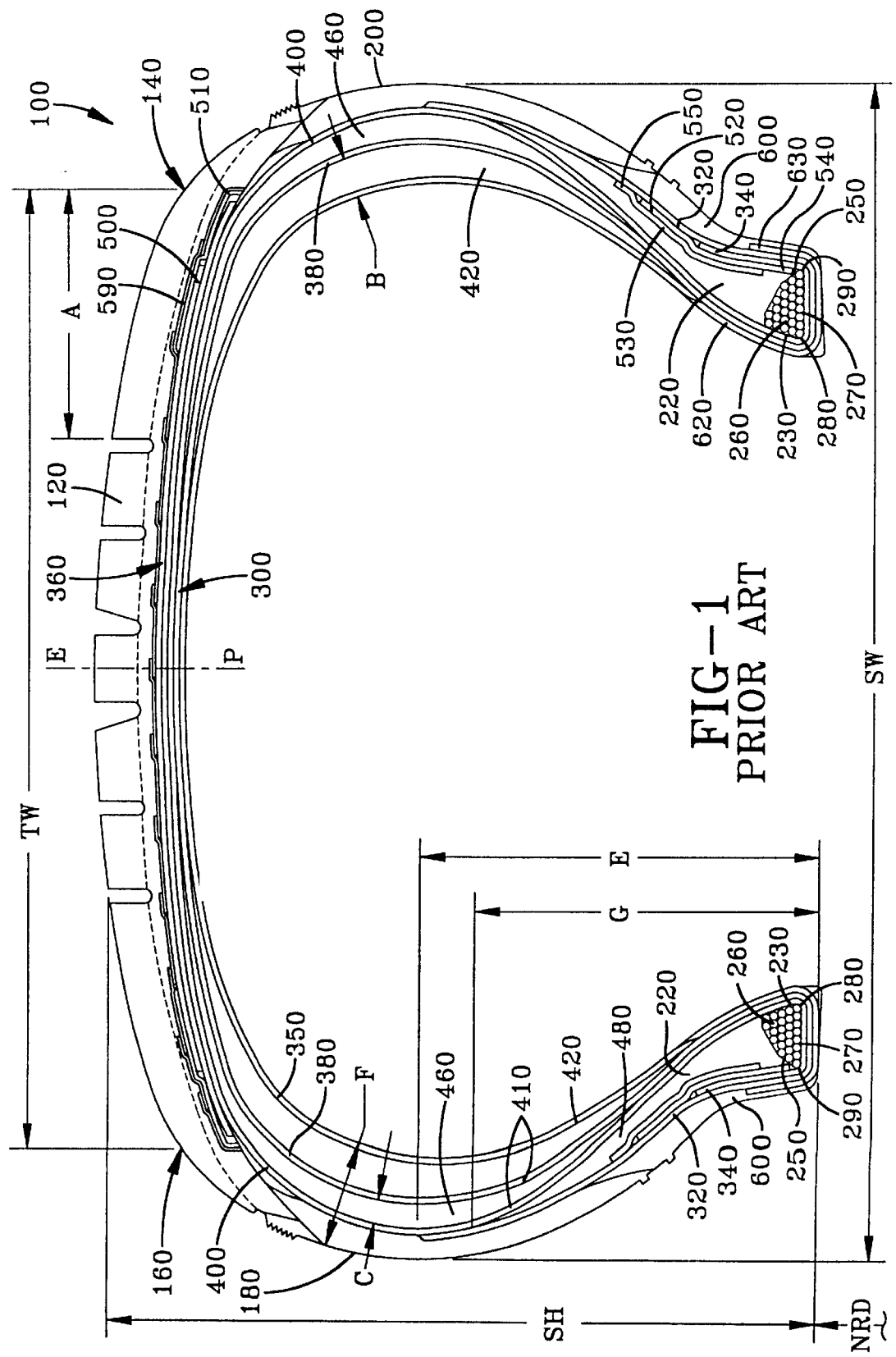
FIG. 1 is a cross-sectional view of a prior art runflat tire made in accordance to the tire as disclosed in U.S. Pat. No. 5,368,082.

"Aspect Ratio" means the ratio of its section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, and undertread, but including the beads.

"Casing" means the carcass, belt structure, beads, sidewalls and all other components of the tire excepting the tread and undertread.

"Chafers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a layer of rubber-coated parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

DETAILED DESCRIPTION OF THE PREFERRED EMBODIMENT

Figure 3C:
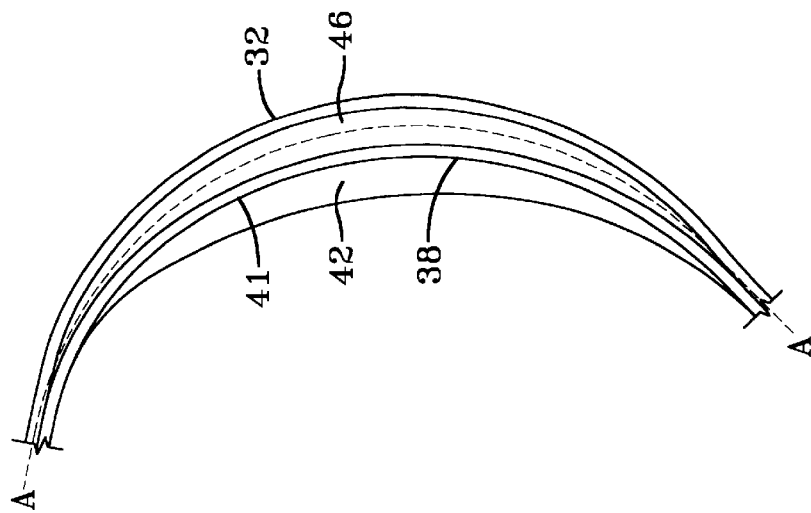
FIGS. 3A, 3B and 3C are cross-sectional schematic views of a prior art sidewall construction, and the sidewall construction of the inventive sidewall construction of the preferred embodiment tire. Each view shows in dashed lines the neutral bending axis.
Figure 3B:
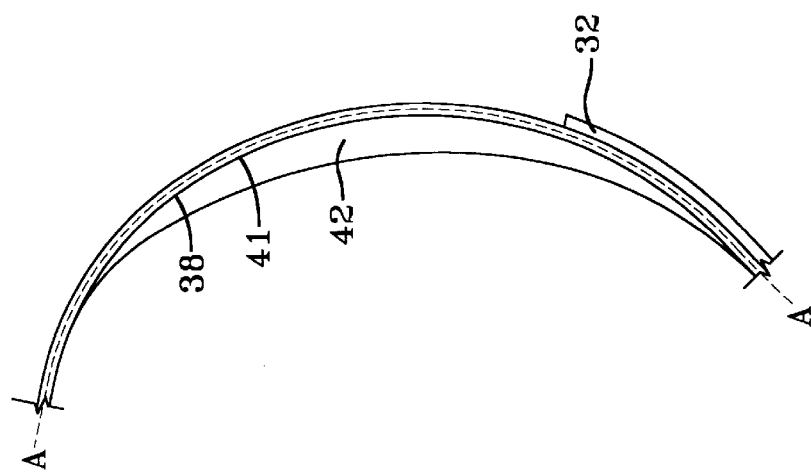
Figure 3A:
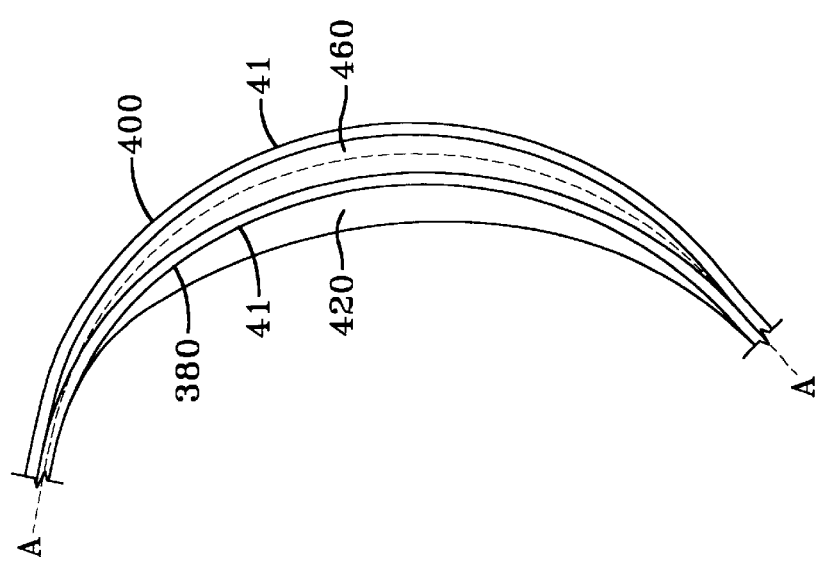

Referring to FIGS. 1 and 3A there is illustrated a portion of the cross section of a prior art tire 100 made in accordance with U.S. Pat. No. 5,368,082. The tire 100 is a passenger tire having a tread 120, a belt structure 360, a pair of sidewall portions 180,200, a pair of bead portions 220,220' and a carcass reinforcing structure 300. The carcass 300 includes a first ply 380 and second ply 400, a liner 350, a pair of beads 260,260' and a pair of bead fillers 480,480', a pair first insert fillers 420,420' and a pair of second insert fillers 460,460', the first insert filler 420,420' being located between the liner 350 and the first ply 380, the second insert fillers 460,460' being located between the first and second ply 380,400. This carcass structure 300 gave the tire 100 a limited runflat capability.

The term runflat as used in this patent means that the tire structure alone is sufficiently strong to support the vehicle load when the tire is operated in the uninflated condition, the sidewall and internal surfaces of the tire not collapsing or buckling onto themselves, without requiring any internal devices to prevent the tire from collapsing.

The conventional pneumatic tire when operated without inflation collapses upon itself when supporting a vehicle load.

As can be seen from FIG. 1 the structural reinforcement in the sidewall area of the tire 100 substantially increased the thickness of the overall sidewall particularly from the maximum section width radially outward to the shoulder. This prior art patent taught that the overall sidewall thickness where it merges with the shoulder should be at least 100% preferably 125% of the overall sidewall thickness as measured at the maximum section width. This was believed to be necessary to sufficiently support the load in an uninflated state. The inserts for a typical P275/40ZR17 tire weighed approximately 6.0 lb. The first insert 420,420' had a maximum gauge thickness of 0.30 inches (7.6 mm) the second insert 460,460' had a maximum gauge thickness of 0.17 inches (4.3 mm). Employing this original prior art concept in a P235/55R17 tire of a higher aspect ratio meant that the insert weight increased to about 6.7 and the gauge thickness of the first insert was 0.260 while the second insert had a maximum gauge of 0.20.

The reference numerals as depicted in the drawings are the same as those referred to in the specification. For purposes of this application the various embodiments illustrated in FIGS. 2, 3B through 8 each use the same reference numerals for similar components. The structures employ basically the same components with variations in location or quantity thereby giving rise to the alternative constructions in which the inventive concept can be practiced.

The tire 10 according to the present invention employs a unique sidewall structure 20. Tires 10 as illustrated in FIGS. 2B, 3C and through 8 are radial passenger or light truck tires; the tires 10 are provided with a ground-engaging tread portion 12 which terminates in the shoulder portions at the lateral edges 14,16 of the tread 12 respectively. A pair of sidewall portions 20 extends from tread lateral edges 14,16 respectively and terminates in a pair of bead regions 22 each having an annular inextensible bead core 26 respectively. The tire 10 is further provided with a carcass reinforcing structure 30 which extends from bead region 22 through one sidewall portion 20, tread portion 12, the opposite sidewall portion 20 to bead region 22. The turnup ends 32 of at least one ply 38 carcass reinforcing structure 30 are wrapped about bead cores 26 and extend radially outwardly to a terminal end 33 directly under the belt structure 36 respectively. Alternatively, the turnup may end at about the radial location of the maximum section width in the embodiment of FIGS. 2A and 3C. The tire 10 may include a conventional innerliner 35 forming the inner peripheral surface of the tire 10 if the tire is to be of the tubeless type.

Figure 2A:
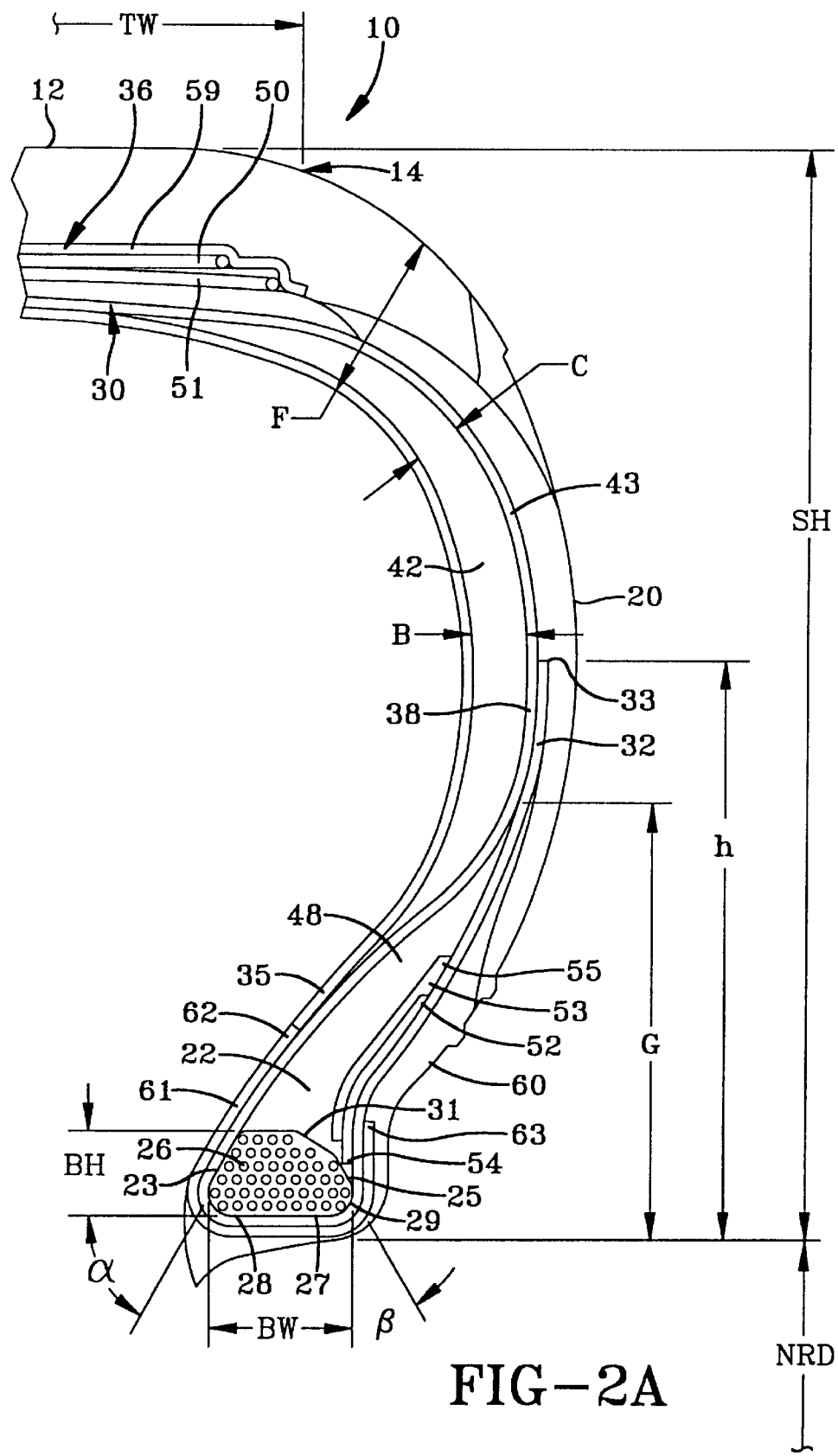
FIG. 2A and 2B are an enlarged fragmentary cross-sectional views of a tread shoulder, a sidewall, and a bead region of the preferred embodiment tires of the invention.
Figure 2B:
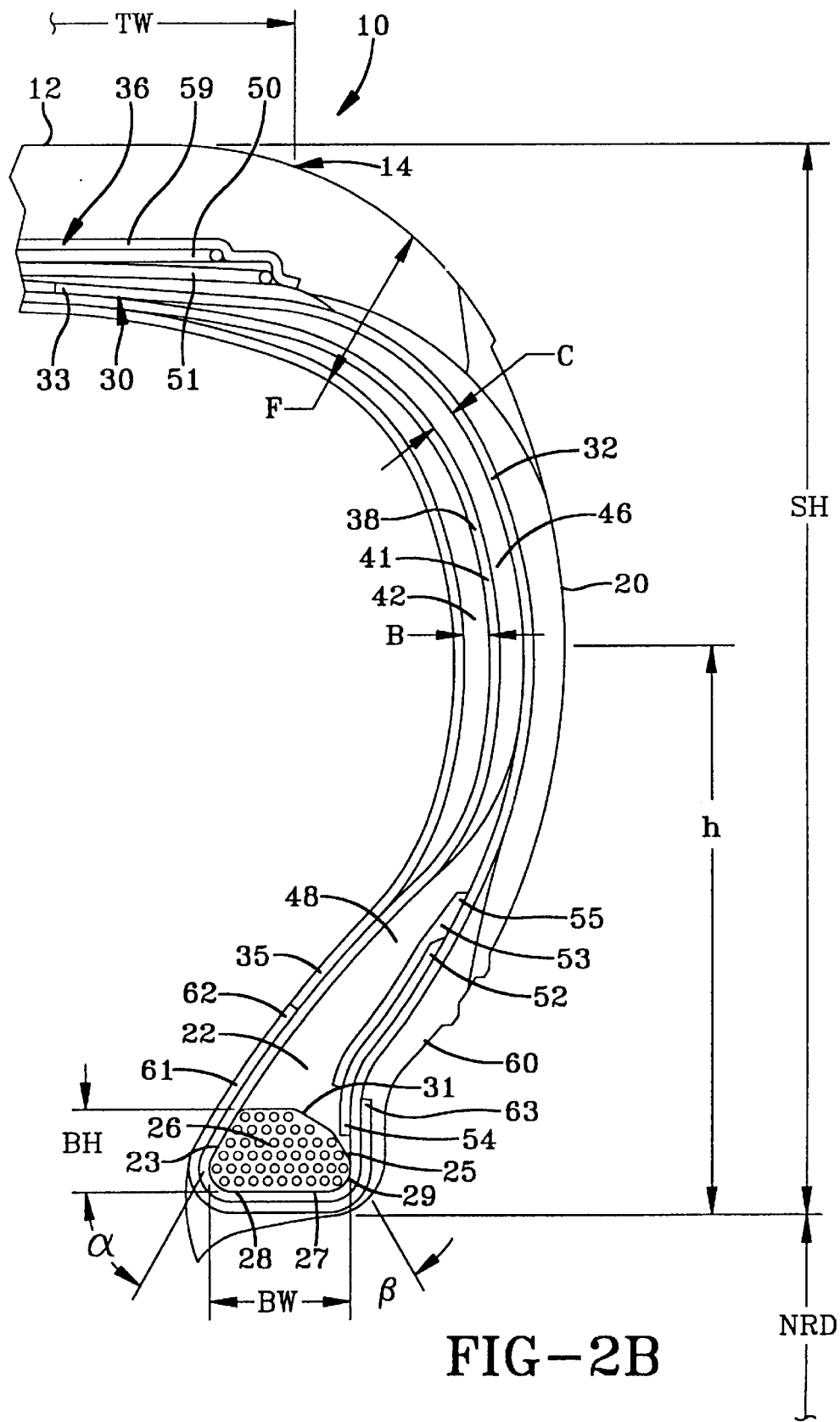

As shown in FIG. 2A the tire can employ a single synthetic ply wrapped over the bead core 26 and extending to a high turnup end 32 located at about the radial location of the maximum section diameter (h). The insert 42 is the only insert needed in addition to the bead filler 48, a single cord reinforcement 52 and a toe guard 61 having an end 63 terminating at a location radially about equal to the apex 48 outer extremity. Such a tire has the bending axis A as shown in FIG. 3B. A test tire of a size 275/40ZR18 was evaluated and it ran 313 miles at zero inflation under lab test condition.

Placed circumferentially about the radially outer surface of carcass reinforcing structure 30 beneath tread portion 12 is a tread reinforcing belt structure 36. In the particular embodiment illustrated, belt structure 36 comprises two cut belt plies 50,51 and the cords of belt plies 50,51 are oriented at an angle of about 23 degrees with respect to the mid-circumferential centerplane of the tire.

The cords of belt ply 50 are disposed in an opposite direction to the mid-circumferential centerplane and from that of the cords of belt ply 51. However, the belt structure 36 may comprise any number of belt plies of any desired configuration and the cords may be disposed at any desired angle. The belt structure 36 provides lateral stiffness across the belt width so as to minimize lifting of the tread from the road surface during operation of the tire in the uninflated state. In the embodiments illustrated, this is accomplished by making the cords of belt plies 50, 51 of steel and preferably of a steel cable construction.

The carcass reinforcing structure 30 comprises at least one reinforcing ply structure 38. In the particular embodiment illustrated in FIG. 2B, there is provided a reinforcing ply structure 38 with a radially outer ply turnup 32, this ply structure 38 has preferably one layer of parallel cords 41. The cords 41 of reinforcing ply structure 38 are oriented at an angle of at least 75 degrees with respect to the mid-circumferential centerplane CP of the tire 10. In the particular embodiment illustrated, the cords 41 are oriented at an angle of about 90 degrees with respect to the mid-circumferential centerplane CP. The cords 41 may be made of any material normally used for cord reinforcement of rubber articles, for example, and not by way of limitation, rayon, nylon and polyester, aramid or steel. Preferably, the cords are made of material having a high adhesion property with rubber and high heat resistance.

For the carcass cords 41, organic fiber cords is with an elastic modulus in the range of 250 to 600 kgf/sq mm such as nylon 6, nylon 6-6, rayon, polyester or high-modulus cords, commonly are used. In the case that 840-to-1890 denier fiber cords are used such cords are preferably embedded in a rubber having a 100% modulus of 10 to 50 kgf/sq cm at a density of 35 to 60 cords/5 cm.

Other high modulus fiber include aramid, vinylon, pen, PET, carbon fiber, glass fiber, polyamides. In the particular embodiment illustrated, the cords 41 are made from rayon. The cords 41 have a modulus E of X and a percent elongation of Y. The preferred rayon cord 41 has X values in the range of at least to 10 GPa and percent elongations in the range commonly found in the specific material of the cord.

As further illustrated in FIG. 2B the ply structure 38 has a pair of turnups 32 which wrap about each bead core 26 extending to under the belts 36 to a terminal end 33.

As further illustrated in FIG. 2, the bead regions 22 of the tire 10 each have an annular substantially inextensible first and second bead cores 26 respectively. The bead cores 26 each have a flat base surface 27 defined by an imaginary surface tangent to the radially innermost surfaces of the bead wires. The flat base surface 27 has a pair of edges 28,29 and a width "BW" between the edges. The bead core 26 has an axially inner first surface 23 extending radially from edge 28 and an axially outer second surface 25 extending radially from edge 29. The first surface 23 and the flat base surface 27 form an acute included angle α. The second surface 25 and the flat base surface 27 form an acute included angle α. The angle α is greater than or equal to the angle β. In the preferred embodiment, α approximately equals β.

The bead core 26 may further include a radially outer surface 31 extending between the first and second surfaces 23,25 respectively. The radial outer surface 31 has a maximum height "BH." The height BH is less than the width of the base BW. The cross-section defined by surfaces 23,25, 27, and 31 preferably are in the form of an isosceles triangle. The upper portion of the triangular shape cross-section is generally not required because the strength of the core 26,26' as illustrated is sufficient to restrain the beads of an uninflated tire on the rim.

The bead core is preferably constructed of a single or monofilament steel wire continuously wrapped. In the preferred embodiment 0.050 inch diameter wire is wrapped in layers radially inner to radially outer of 8,7,6,4,2 wires, respectively.

The flat base surfaces of the first and second bead cores 26 are preferably inclined relative to the axis of rotation, and the bottom of the molded portion of the bead is similarly inclined, the preferred inclination being approximately about 10° relative to the axis of rotation more preferably about 10.5°. The inclination of the bead region assists sealing the tire and is about twice the inclination of the bead seat flange of a conventional rim and is believed to facilitate assembly and to assist retaining the beads seated to the rim.

Located within the bead region 22 and the radially inner portions of the sidewall portions 20 are high modulus elastomeric inserts 46 disposed between carcass ply reinforcing structure 38 and the turnup ends 32, respectively. The elastomeric inserts 46 extend from the radially outer portion of bead cores 26 respectively, up into the sidewall portion gradually decreasing in cross-sectional width. The elastomeric inserts 46 terminate at a radially outer end at a distance G laterally inward of the belt structure from the of at least 5 percent (5%) of the belt width of the tire. In the particular embodiment illustrated, the elastomeric fillers 46 each extend laterally under the belts 36, from their respective belt ends, a distance of approximately 25 percent (25%) of the belt width.

For the purposes of this invention, the maximum section height SH of the tire shall be considered the radial distance measured from the nominal rim diameter NRD of the tire to the radially outermost part of the tread portion of the tire. Also, for the purposes of this invention, the nominal rim diameter shall be the diameter of the tire as designated by its size.

In a preferred embodiment of the invention the bead regions 22 further includes at least one cord reinforced member 52,53 located between the insert 46 and the ply turnup end 32. The cord reinforced member or members 52,53 have a first end 54 and a second end 55. The first end 54 is axially and radially inward of the second end 55. The cord reinforced member or members 52,53 increase in radial distance from the axis of rotation of the tire 10 as a function of distance from its first end 54. In the illustrated FIG. 2B, the cord reinforced member comprises two components 52,53 having a width of about 4 cm. The axially outer component 52 has a radially inner end 54 that is radially above with the outer edge 29 of the first and second bead cores 26. The axially inner component 53 has a radially inner end that is radially outward of the outer edge 29 of the bead core 26 by about 1 cm. The axially inner and axially outer components 52,53, preferably have rayon, nylon, aramid or steel cord reinforcement. The second end 55 of the cord reinforced member is located radially outward of the bead core 26 and radially inward of the termination of the turnup end 33 of the first ply 38 by a distance at least 50% of the section height h.

The cords of members 52,53 are preferably inclined forming an included angle relative to the radial direction in a range from 25° to 75°, preferably 45°. If two members are employed, the cord angles are preferably equal but oppositely disposed. The cord reinforcement member 52,53 improves the handling characteristics of a car having an uninflated tire of the present invention. The members 52,53 greatly reduce the tendency for the car to oversteer, a significant problem encountered in conventional tires that are driven while uninflated or underinflated.

A fabric reinforced member 61 may be added to the bead regions 22 of the tire 10. The fabric reinforced member has first and second ends 62,63. The member is wrapped about the first and the second plies 38,40 and the bead core 26. Both the first and the second ends 62,63 extend radially above and outward of the bead core 26.

The sidewall portions 20 are provided with first fillers 42. The first fillers 42 is employed between the innerliner 35 and the reinforcement ply 38. The first fillers 42 extend from each bead region 22 radially to beneath the reinforcing belt structures 36. As illustrated in the preferred embodiment of the invention as shown in FIGS. 2B and 3B, the sidewall portions 20 each include a first filler 42 and a second filler 46. The first fillers 42 are positioned as described above. The second fillers 46 are located between the first ply 38 and the turnup ends 32 of ply 38 respectively. The second-filler 46 or 46/48 when a dual compound extends from each bead region 22 radially outward to beneath the reinforcing belt structure 36.

As shown in the FIG. 2B, the first fillers 42 have a maximum thickness B at a location approximately radially aligned with the maximum section width of the tire 10, the thickness B being about three percent (3%) of the maximum section height SH. For example, in a P235/55R17 touring tire the thickness B of the insert 42 equals 0.10 inch (2.5 mm)

For purposes of this invention, the maximum section width (SW) of the tire is measured parallel to the rotational axis of the tire from the axially outer surfaces of the tire, exclusive of indicia, adornment and the like. Also, for the purposes of this invention the tread width is the axial distance across the tire perpendicular to the equatorial plane (EP) of the tire as measured from the footprint of the tire inflated to maximum standard inflation pressure, at rated load and mounted on a wheel for which it was designed. In the particular embodiments illustrated in FIGS. 2, 3B and 3C, the first fillers 42 each have a maximum thickness B of approximately 3 percent (3%) of the maximum section height SH at a location (h) approximately radially aligned the maximum section width of the tire.

The second fillers 46 have a thickness C of at least one and one-half percent(1.5%) of the maximum section height of the tire 10 at the location radially above the maximum section width of the tire. In the preferred embodiment the elastomeric second fillers 46 each have a thickness C of approximately one and one-half percent (1.5%) of the maximum section height SH of the tire at a radial location of about 75% of the section height SH. For example, in a P275/40ZR17 size high performance tire the thickness C of the tire equals 0.08 inches (2 mm). At the location h, approximately radially aligned with the location of the maximum section width of the tire, the thickness of the second filler 46 is 0.05 inches (1.3 mm).

The overall cross-sectional thickness of the combination of elastomeric fillers 42,46 preceding from the bead cores 26 to the radial location of the maximum section width (SW) is preferably of constant thickness. The overall sidewall and carcass thickness is about 0.45 inches (11.5 mm) at the maximum section width location E and increases to an overall thickness F, in the region where it merges into the shoulder near the lateral tread edges 14,16, F being less than two hundred percent (200%) of the overall sidewall thickness as measured at the maximum section width SW of the tire. Preferably, the overall thickness F of the sidewall in the shoulder region of the tire is at least one hundred twenty five percent (125%) of the overall sidewall thickness at the maximum section width (SW), more preferable at least 150%. This ratio means that the sidewall is substantially thinner than the predecessor type runflat tires.

As in the conventional high performance type tires, the tires illustrated in the Figures of the various embodiments may enhance the high speed performance of the tire by the application of a fabric overlay layer 59 disposed about the tread reinforcing belt structure 36. For example, two ply layers having nylon or aramid cords may be disposed above each reinforcing belt structures 36, the lateral ends extending past the lateral ends of the belt structures 36. Alternatively, a single layer of spirally wound aramid reinforced fabric can be employed as an overlay. The aramid material has a substantially higher modulus of elasticity than nylon and accordingly results in a stronger tire reinforcement than two layers of nylon. Applicants have found that a greater than 10% increase in high speed capability can be achieved in a tire with the single layer of aramid overlay. Generally the use of aramid material in passenger tire applications is avoided due in part to the fact that the material exhibits poor noise properties that resonate sounds through the relatively thin sidewalls of the passenger tire. Applicants' tire is of the present invention employs reinforced sidewalls which noticeably dampen tire generated noises. The noise dampening sidewalls permit the use of an aramid overlay without experiencing unacceptable noise levels.

The second fillers 46, as shown, are made of one or two or more distinct elastomeric materials, the dual compound version shown as 46,48 in FIG. 2B has the inserts portion being radially outward of the apex portion 48. These filler inserts 46 can be used in multiples of inserts interposed between adjacent plies when more than two plies are used in the carcass structure as shown in FIG. 6B. The preferred embodiments employed only one compound or material in the single inserts 46 which extended from the bead core 26 to under the belt structure 36.

Figure 4:
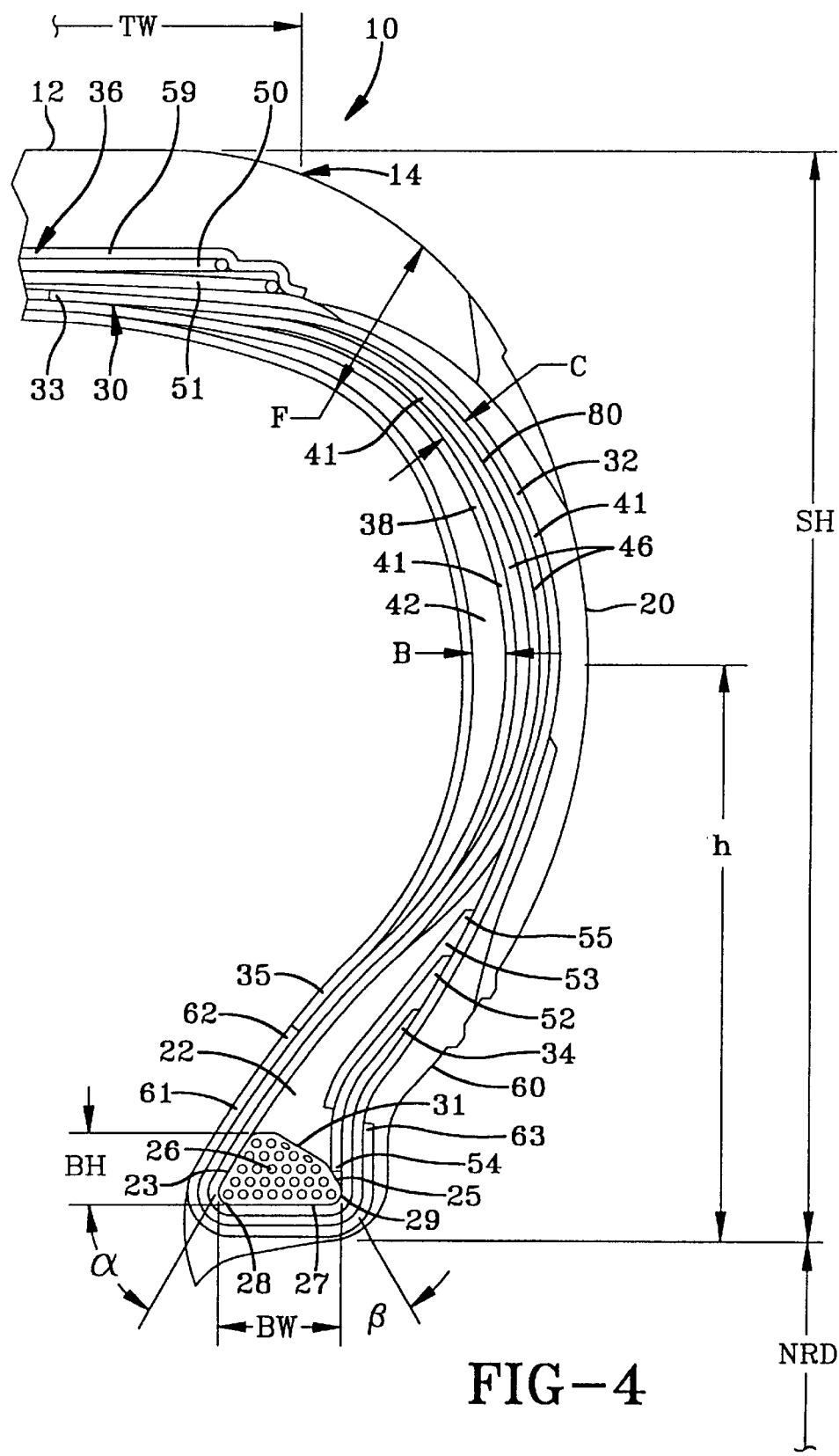
FIG. 4 is an alternative embodiment wherein the multiple inserts 46 are cord reinforced.
Figure 5:
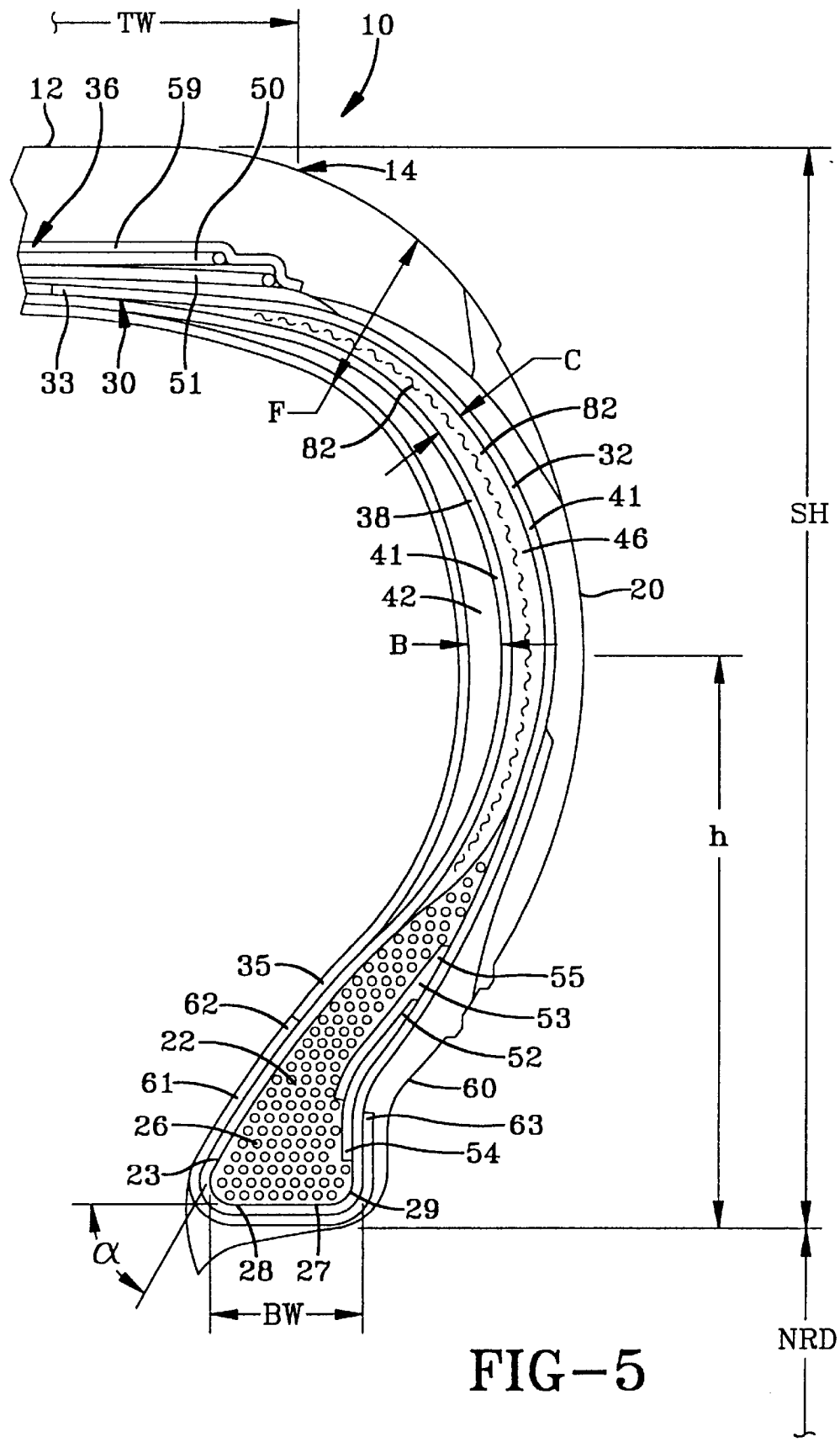
FIG. 5 is an alternative embodiment wherein the inserts 46 are short fiber loaded.

Alternatively, the inserts 46 may be cord reinforced themselves, in the embodiment of FIG. 4 the uses of adjacent fillers 46 is considered beneficial. The multiple adjacent cord 41 reinforced fillers can be positioned such that the radially outer ends are either terminated under the belt structure while the radially inner ends terminate adjacent to the bead cores 26 or are wrapped around the bead cores 26, similar to a ply. The inserts 46 may alternatively be loaded with short fibers 82 as shown in FIG. 5, which are preferably oriented at an angle of at least 45° to enhance the radial and lateral stiffness of the insert, preferably the fibers are radially oriented. Preferably the cords 41 or short fibers 82 are made of textile or synthetic materials such as rayon, nylon, polyester or arimid. These cords 41 or short fibers 82 can be radially directed or positioned at bias angles preferably at least 45° but should not be circumferentially extending. Additionally, the inserts 80 can be reinforced with high modulus steel cords. In such a case the terminal ends should be securely encased between layers of another cord reinforced member or component such as the belt 36, the ply 38, and the turnup 32 and other fabric or cord reinforcements 52,53. Additionally, the ends can be cut using a sawtooth or sinusoidal pattern to insure that the transition from inextensible steel cords, ends and the extensible rayon is spread over or larger linear path to prevent end separations.

The first filler insert 42 is preferably made of elastomeric material. The first filler actually prevents the tire's sidewall from collapsing when operating under no inflation pressure the insert can be of a wide range of shore A hardnesses from a relative soft shore A of about 50 to very hard 85, the material shape and cross-sectional profile is modified accordingly to insure the ride performance and sidewall spring rate is acceptable. The stiffer the material the thinner the cross-section generally.

The second filler 46 can be of the same or different material physical properties relative to the first insert filler 42. This means that the combination of a hard second filler with a soft first filler is contemplated as well as the combination of a hard first filler 42 with a softer second filler 46. The elastomeric materials of the second filler 46 similarly are in the 50 to 85 shore A range.

The second fillers 46 when unreinforced act as a spacer between the adjacent ply 38 and its turnup 32. The cords of the plies particularly the radially outer ply turnup is placed in tension when the tire is operated uninflated. When reinforced the fillers 80 also contributed to the sidewall supporting structure.

As shown, the sidewalls when deflected under no inflation pressure or even when inflated, place the radially outer cords into tension while the radially inner cords when experiencing a downward load try to locally compress the cords when the tire is deflated or deflected.

This loading feature is similar for this inventive tire 10 as it was in the prior art tire 100 structure of FIG. 1 and described by U.S. Pat. No. 5,368,082.

Figure 6:
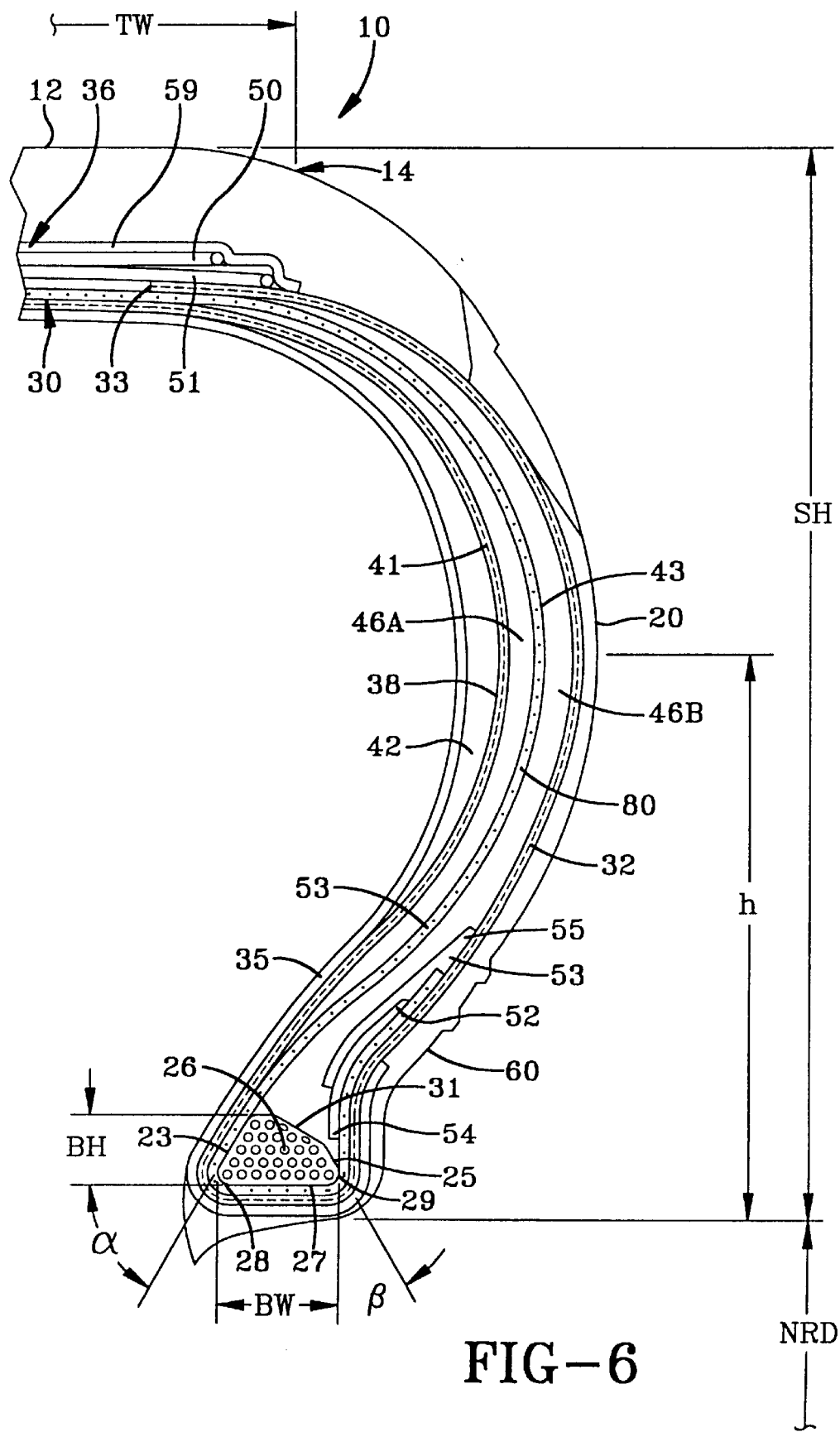
FIG. 6 is views of a composite sidewall material having cords of differing moduli.

Referring to FIGS. 6, by changing the modulus of the cords 41 in the ply 38 and cord 41 or 43 of the reinforced insets 80 wherein the cords in the one ply structure 38 has modulus different from the reinforced insert structure 80, preferably substantially different a surprisingly substantial increase in runflat durability can be achieved with the added benefit of ride performance improvements.

The tire 10 as described above enables the tire designer to tune a particular tire's design features to achieve a soft luxurious feel to a stiffer more performance feel. Furthermore, the unique combination described above permits tires to be built having higher aspect ratios than heretofore was practical. The combination of unique features means that the designer can choose between extended runflat performance or tire weight reductions as well.

Runflat performance of the tire may be further enhanced by providing the ply coat of each layer of the reinforcing ply structures 38 or 80 with an elastomeric material having substantially the same physical properties as that of the elastomeric fillers 42,46. As is well known to those skilled in the tire art, the ply coat of a fabric layer is the layer of unvulcanized elastomeric material which is applied to fabric prior to its being cut to its desired shape and applied to the tire on the tire building drum. In many applications it is preferable that the elastomeric material used as a ply coat for the ply layers is similar to the elastomeric material used in the reinforcing fillers 42,46.

In practice, the rubber compositions for the first fillers 42, second fillers 46 and the ply coats for one or more ply structures 38 and 80 utilized in this invention for the aforesaid pneumatic tire construction are preferably characterized by physical properties which enhance their utilization in the invention which are, collectively, believed to be a departure from properties of rubber compositions normally used in pneumatic tire sidewalls, particularly the combination of first and second fillers 42 and 46 with plies 38 and/or 80 having a combination of either dissimilar or similar high stiffness yet essentially low hysteresis properties as hereinafter described.

Preferably, while the discussion herein refers to the ply coat(s) being for one or more of ply structures 38 and 80, in the practice of this invention, the plycoats referenced herein refers to plycoats for both plies 38 and 40 unless only one of such plies is used.

In particular, for the purposes of this invention, both of the aforesaid fillers 42 and 46 were evaluated by having a high degree of stiffness yet by also having a relatively low hysteresis for such a degree of stiffness.

The stiffness of the rubber composition for fillers 42 and 46 is desirable for stiffness and dimensional stability of the tire sidewall.

The stiffness of the rubber composition for the ply coat for one or more of plies 38 and 80 is desirable for overall dimensional stability of the tire carcass, including its sidewalls, since it extends through both sidewalls and across the crown portion of the tire.

As a result, it is considered that the stiffness properties of the aforesaid rubber compositions of the first and second fillers 42 and 46 and of the ply structures 38 and/or 80 cooperate with the plies 38 and/or 80 to reinforce each other and to enhance the aforesaid dimensional stability of the tire sidewalls to a greater degree than if either of the aforesaid fillers or plycoats were alone provided with a high stiffness rubber composition.

However, it is to be appreciated that rubbers with a high degree of stiffness in pneumatic tires normally be expected to generate excessive internal heat during service conditions (operating as tires on a vehicle running under load and/or without internal inflation pressure), particularly when the rubber's stiffness is achieved by a rather conventional method of simply increasing its carbon black content. Such internal heat generation within the rubber composition typically results in a temperature increase of the stiff rubber and associated tire structures which can potentially be detrimental to the useful life of the tire.

The hysteresis of the rubber composition is a measure of its tendency to generate internal heat under service conditions. Relatively speaking, a rubber with a lower hysteresis property generates less internal heat under service conditions than an otherwise comparable rubber composition with a substantially higher hysteresis. Thus, in one aspect, a relatively low hysteresis is desired for the rubber composition for the fillers 42 and 46 and the plycoat(s) for one or more of the ply 38.

Hysteresis is a term for heat energy expended in a material (eg: cured rubber composition) by applied work and low hysteresis of a rubber composition is indicated by a relatively high rebound, a relatively low internal friction and relatively low loss modulus property values.

Accordingly, it is important that the rubber compositions for one or more of the fillers 42 and 46 and plycoats for one or more of plies 38 and 80 have the properties of both relatively high stiffness and low hysteresis.

The following selected desirable properties of the rubber compositions for the fillers 42 and 46 as well as for the plycoats for one or more of the ply 38 are summarized in the following Table 1.

TABLE 1

| Properties | Filler | Ply Coat |
|---|---|---|
| Hardness (Shore A)[2] | 50–85 | 50–85 |
| Modulus (100%) MPa[3] | 5–7 | 4–6 |
| Static Compression[1] | 0.1–0.15 | 0.15–0.2 |
| Heat Buildup (° C.)[1] | <30 | <30 |
| Cold Rebound (about 23° C.)[4] | 55–70 | 55–70 |
| E' at 100° C. (MPa) | 10–15 | 10–15 |
| E" at 100° C. (MPa) | 0.5–1.5 | 1–1.5 |

[1]Goodrich Flexometer Test-ASTM Test No. D623
[2]Shore Hardness Test-ASTM Test No. D2240
[3]Tension Modulus Test-ASTM Test No. D412
[4]Zwick Rebound Test-DIN 53512

The indicated hardness property is considered to be an expanded range of moderate rubber hardness permitted by the use of the unique ply structure.

The indicated modulus property at 100% modulus is utilized instead of a 300% modulus because the cured rubber has a relatively low ultimate elongation at its breaking point. Such a cured rubber is considered stiff.

The indicated static compression property, measured on a flexometer, is another indication of the relatively high stiffness of the cured rubber.

The indicated E' property is a coefficient of the storage or elastic moduli component of the viscoelastic property which is an indication of the material (eg: cured rubber composition) stiffness.

The indicated E" property is a coefficient of the loss or viscous moduli component of the viscoelastic property which is an indication of the hysteretic nature of the material (eg: cured rubber composition).

The utilization of both the E' and E" properties to characterize stiffness and hysteresis of rubber compositions is well known to those having skill in such characterizations of rubber.

The indicated heat buildup value is measured by a Goodrich flexometer (ASTM D623) test and is indicative of the internal heat generation of the material (eg: cured rubber composition).

The indicated cold rebound test property at about 23° C. (room temperature) is measured by Zwick Rebound Test (DIN 53512) test and is indicative of the material's (eg: cured rubber composition) resilience.

Thus, the properties illustrated in Table 1 indicate a cured rubber composition with a relatively high stiffness, moderate hardness and a relatively low hysteresis for a rubber with such a high stiffness.

The low hysteresis is demonstrated by the relatively low heat buildup, low E" and high rebound properties and is considered necessary for a rubber composition desired to have a relatively low internal heat buildup in service.

In the compounding of the various tire components, various rubbers may be used which are, preferably, relatively high unsaturation diene-based rubbers. Representative examples of such rubbers are, although they may not be so limited, are: styrene-butadiene rubber, natural rubber, cis 1,4 and 3,4-polyisoprene rubbers, cis 1,4 and vinyl 1,2-polybutadiene rubbers, acrylonitrile-butadiene rubber, styrene-isoprene-butadiene rubber and styrene-isoprene rubber.

Various of the preferred rubbers for the rubber compositions for the fillers 42 and 46 and for the plycoat(s) for one or more of the plies 38 and 80 are natural cis 1,4-polyisoprene rubber, isoprene/butadiene rubber, and cis 1,4-polybutadiene rubber.

Preferred combinations, or blends, of rubbers are natural cis 1,4-polyisoprene rubber and cis 1,4-polybutadiene rubber for the fillers and natural cis 1,4-polybutadiene rubber and isoprene/butadiene copolymer rubber for the plycoat(s).

In a preferred practice, based on 100 parts by weight rubber, (A) the fillers are comprised of about 60 to 100, preferably about 60 to 90, parts natural rubber and, correspondingly, up to about 40, preferably about 40 to about 10, parts of at least one of cis 1,4 polybutadiene rubber and isoprene/butadiene rubber preferably cis 1,4-polybutadiene rubber, where said isoprene/butadiene rubber, if used, is present in a maximum of 20 parts, and (B) the said plycoat(s) are comprised of up to 100, preferably about 80 to about 100 and more preferably about 80 to about 95, parts natural rubber and, correspondingly, up to about 100, preferably up to about 20 and more preferably about 20 to about 5, parts of at least one of isoprene/butadiene copolymer rubber and cis 1,4 polybutadiene rubber, preferably an isoprene/butadiene rubber; wherein the ratio of isoprene to butadiene in said isoprene/butadiene copolymer rubber is in a range of about 40/60 to about 60/40.

It is further contemplated, and is considered to be within the intent and scope of this invention that a small amount, such as about 5 to about 15 parts, of one or more organic solution polymerization prepared rubbers may be included with the aforesaid natural rubber, and cis 1,4 polybutadiene rubber and/or isoprene/butadiene rubber composition(s) for the said fillers and/or plycoat(s), of which the option and selection of such additional rubber(s) can be made by one having skill in the rubber compounding art without undue experimentation.

Thus, in such circumstance, the description of the filler and plycoat rubbers is set forth in a "comprising" manner with the intent that small amounts of such solution polymerization prepared elastomers can be added so long as the aforesaid physical property parameters of the cured rubber compositions are met. It is considered that such rubber compounding is within the skill of those with experience in the rubber compounding art without undue experimentation.

While not necessarily limited thereto, such other contemplated solution prepared rubbers are styrene/butadiene, and polymers of one or more of isoprene and butadiene such as 3,4-polyisoprene, styrene/isoprene/butadiene terpolymers and medium vinyl polybutadiene.

It should readily be understood by one having skill in the art that rubber compositions for components of the pneumatic tire, including the first and second fillers 42 and 46 as well as ply coat(s) for one or more or ply 38, can be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as rubber processing oils, resins including tackifying resins, silicas, and plasticizers, fillers, pigments, stearic acid or other materials such as tall oil resins, zinc oxide, waxes, antioxidants and antiozonants, peptizing agents and reinforcing materials such as, for example, carbon black. As known to those skilled in the art, depending on the intended use of the sulfur vulcanizable and sulfur vulcanized materials (rubbers), the certain additives mentioned above are selected and commonly used in conventional amounts.

Typical additions of carbon black comprise about 30 to about 100 parts by weight, of diene rubber (phr), although about 40 to about a maximum of about 70 phr of carbon black is desirable for the high stiffness rubbers desired for the indicated fillers and plycoat(s) used in this invention. Typical amounts of resins, if used, including tackifier resins and stiffness resins, if used, including unreactive phenol formaldehyde tackifying resins and, also stiffener resins of reactive phenol formaldehyde resins and resorcinol or resorcinol and hexamethylene tetramine may collectively comprise about 1 to 10 phr, with a minimum tackifier resin, if used, being 1 phr and a minimum stiffener resin, if used, being 3 phr. Such resins may sometimes be referred to as phenol formaldehyde type resins. Typical amounts of processing aids comprise about 4 to about 10.0 phr. Typical amounts of silica, if used, comprise about 5 to about 50, although 5 to about 15 phr is desirable and amounts of silica coupling agent, if used, comprise about 0.05 to about 0.25 parts per part of silica, by weight. Representative silicas may be, for example, hydrated amorphous silicas. A representative coupling agent may be, for example, a bifunctional sulfur containing organo silane such as, for example, bis-(3-triethoxy-silylpropyl) tetrasulfide, bis-(3-trimethoxy-silylpropyl) tetrasulfide and bis-(3-trimethoxy-silylpropyl) tetrasulfide grafted silica from DeGussa, AG. Typical amounts of antioxidants comprise 1 to about 5 phr. Representative antioxidants may be, for example, diphenyl-p-phenylenediamine and others, such as those disclosed in the *Vanderbilt Rubber Handbook* (1978), pages 344–346. Suitable antiozonant(s) and waxes, particularly microcrystalline waxes, may be of the type shown in the *Vanderbilt Rubber Handbook* (1978), pages 346–347. Typical amounts of antiozonants comprise 1 to about 5 phr. Typical amounts of stearic acid and/or tall oil fatty acid may comprise about 1 to about 3 phr. Typical amounts of zinc oxide comprise about 2 up to about 8 or 10 phr. Typical amounts of waxes comprise 1 to about 5 phr. Typical amounts of peptizers comprise 0.1 to about 1 phr. The presence and relative amounts of the above additives are not an aspect of the present invention which is primarily directed to the utilization of specified blends of resins in tire treads as sulfur vulcanizable compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 8 phr with a range of from 3 to about 5 being preferred for the stiff rubbers desired for use in this invention.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 3 phr. In another embodiment, combinations of two or more accelerators in which a primary accelerator is generally used in the larger amount (0.5 to about 2 phr), and a secondary accelerator which is generally used in smaller amounts (0.05–0.50 phr) in order to activate and to improve the properties of the vulcanizate. Combinations of such accelerators have historically been known to produce a synergistic effect of the final properties of sulfur cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound, although a second sulfenamide accelerator may be used. In the practice of this invention, one and sometimes two, or more accelerators are preferred for the high stiffness rubbers.

The tire can be built, shaped, molded and cured by various methods which will be readily apparent to those having skill in the art.

As disclosed, the test tires 10 and the prior art tires 100 were constructed using the physical properties of the ply coat and the inserts as disclosed in the prior art patent. The tire 10 of the present invention contemplates using a wider range of materials of differing physical properties such that the fillers 42, 46 and 48 and the plycoats for the ply 38 may each be distinctively different and selected for the desired ride, handling and runflat performance needed. In other words, the designer can selectively tune the materials individually to achieve to desired tire performance

EXAMPLE 1

The following rubber compositions are provided which are intended to exemplary of rubber compositions with properties which can fall within those exemplified in Table 1.

Rubber compositions are prepared and mixed by conventional rubber mixing processes and comprised of the materials shown in Table 2 which represent rubber compositions which may be contemplated for use as fillers 42 and 46 and ply coat(s) for one or more of plies 38 and 80. The indicated amounts of materials have been rounded for the illustration of this Example.

TABLE 2

|  | (Parts by Weight) | |
| --- | --- | --- |
| Material | Plycoat | Filler |
| Natural Rubber[1] | 90 | 80 |
| Isoprene/Butadiene Rubber[2] | 10 | 0 |
| Polybutadiene (cis 1,4-) Rubber[3] | 0 | 20 |
| Carbon black | 55 | 55 |
| Silica & Coupler | 6 | 6 |
| Zinc Oxide | 5 | 8 |
| Accelerators (Sulfenamide type) | 4 | 2 |
| Sulfur (insol w/20% oil) | 2 | 4 |

[1]Cis 1,4-polyisoprene type
[2]Copolymer with ratio of isoprene to butadiene of about 1:1
[3]A high cis 1,4 polybutadiene rubber Conventional amounts of rubber processing oil and tall oil fatty acid, collectively about 5 parts with a minimum of 1 part each; antidegradants; tackifying and stiffening resins, primarily of the phenolformaldehyde type in an amount of about 6 phr; and silica and coupling agent therefore; are used with two accelerators for the plycoat sample and one accelerator for the filler rubber composition sample.

The rubber compositions are molded and cured at about 150° C. for about 20 minutes.

In the practice of this invention, it is considered important that the rubber compositions for one or both the fillers 42 and 46 and the ply coat(s) for one or more of plies 38 and 40 are relatively very stiff, moderately hard, and have a low hysteresis.

Further, it is normally desired that the rubber composition for fillers 42 and 46, relative to the rubber composition for plycoats for ply 38 and inserts 80, is slightly stiffer, slightly harder and that both of the rubber composition have a relatively low hysteresis.

It is important to appreciate that the indicated physical properties of the rubber compositions in Table 1 are for samples thereof and that the dimensions, including thickness, of the resulting tire components (fillers and plies) need be taken into account as factors contributing to the overall stiffness and dimensional stability of the tire sidewall and carcass.

It is considered important that the stiffness of the rubber composition for fillers 42 and 46 is somewhat greater than that of the aforesaid ply coat rubber composition because they are not a part of a fabric reinforced ply and further, because it is desired to somewhat maximize their stiffness property.

The hysteresis, or E", and heat buildup values for the rubber composition for the aforesaid fillers is desirably somewhat lower than that for the rubber composition for the aforesaid ply coat(s) because of the bulk of the fillers versus the thin dimensions of the fabric reinforced plies.

Chafing of the tire in the lower bead region radially outward of the carcass structure 30 adjacent the rim flange may be minimized, especially during use of the tire in the uninflated condition, by providing hard rubber chafer portion 60.

Figure 7:
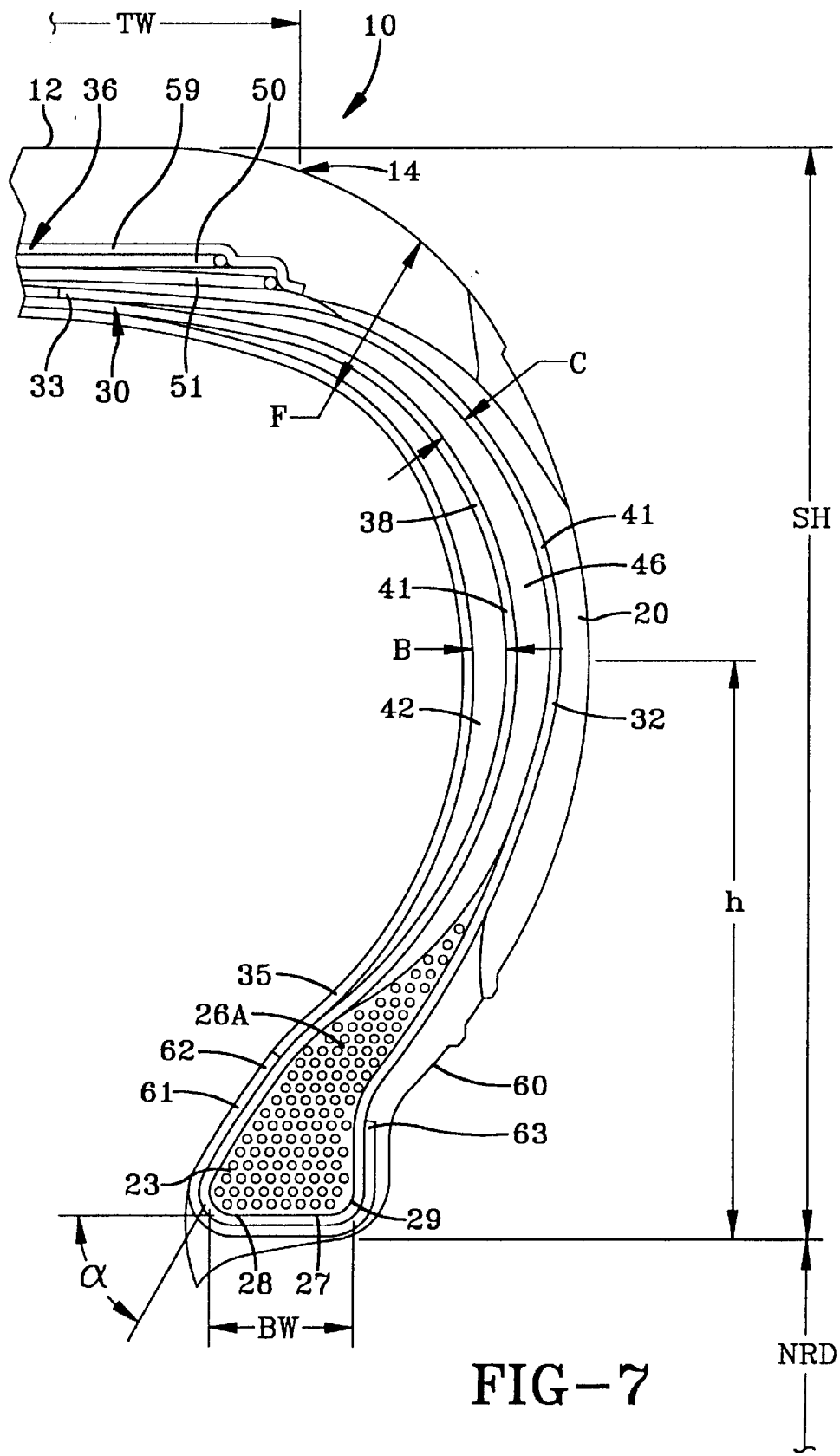
FIG. 7 is an alternative embodiment showing an extended bead used in the sidewall cross-section.

In FIG. 7 the same sidewall construction as is shown in FIGS. 2A or 2B with the exception that the cord reinforcements 52,53 can be replaced by the bead core 26A. The bead core 26A has a radially outer triangular portion than is cantilevered laterally outward of the bead base and extends radially outward above the design rim flange to which the tire 10 is to be mounted. This bead core 26A provides the lower sidewall 20 with lateral stiffness for improved handling while eliminating the need for the cord reinforcements. Alternatively, if additional support is need the combination of reinforcements 52,53 and the bead core 26A can be used.

Figure 8:
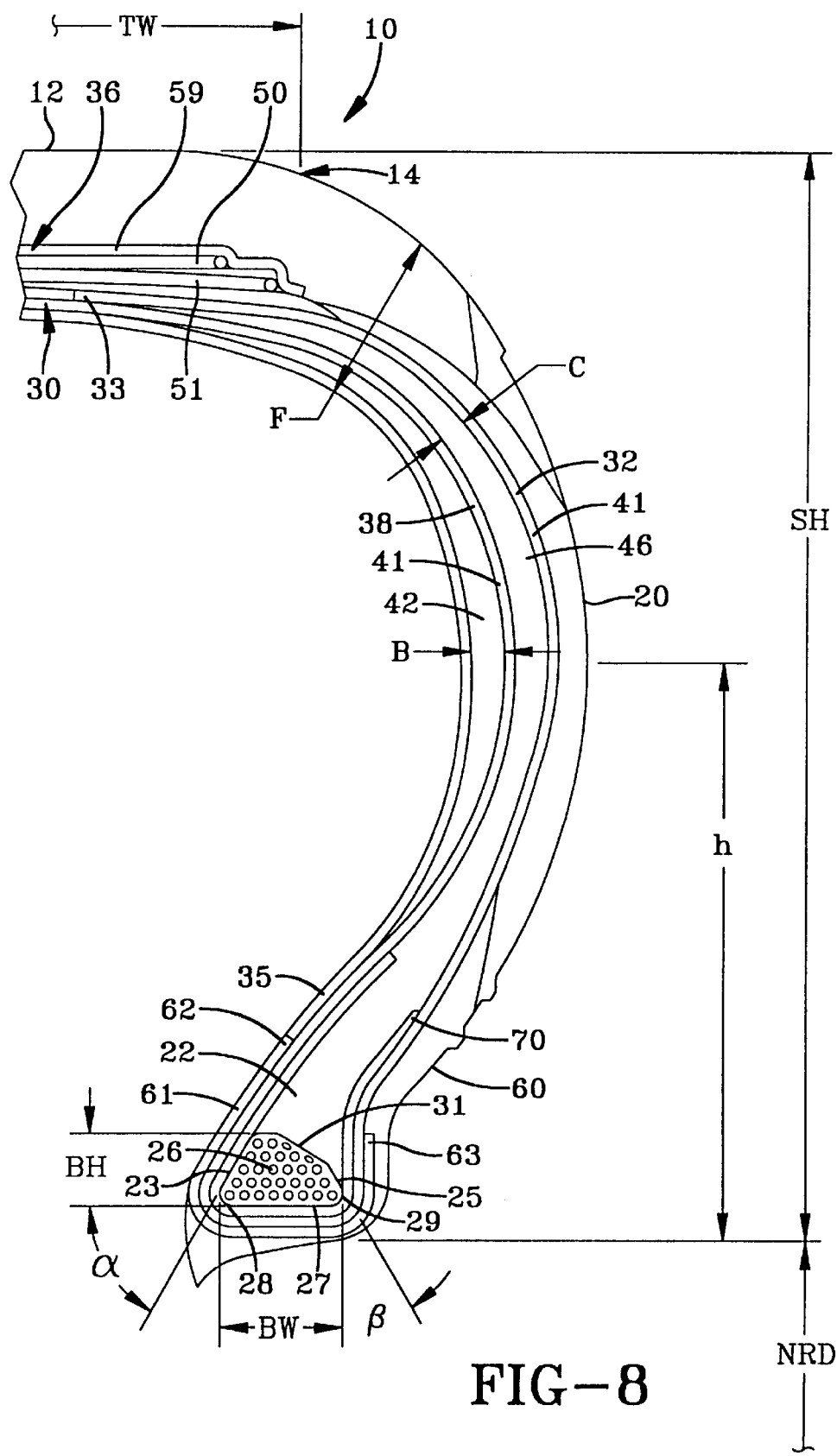
FIG. 8 is an alternative embodiment using a bias cord reinforced structure wrapped about the bead core as shown in the cross-section.

In FIG. 8 the cord reinforcements 52,53 are replaced with one or more bias cord reinforced members 70, the member 70 is commonly referred to as a "flipper" which is wrapped about the bead core 26 and extends radially outwardly one each side of the filler 46 to ends radially located a similar distance to where the reinforcements 52,53 would have ended if used. This single component reduces the number of components shown in FIG. 2 of the preferred embodiment by one. The flipper or flippers 70 are preferably made of cords of the same material described for the reinforcements 52,53 and similarly has bias oriented cords oriented preferably at about 45° and staggered ends when multiple flippers 70 are employed.

An important feature of all the embodiments shown is that the radially outer ends of the inserts 42,46,80 should taper in cross-section as they approach the belts and rapidly diminish in cross-sectional thickness to their respective ends, the ends most preferably being staggered and both ending in the range of 5% to 25% of the belt width axially inward from the lateral end of the belt structure 36. If the inserts 42, 46 are terminated too soon runflat performance is degraded. If the inserts extend too far inwardly or have too thick a cross-section, rolling resistance is adversely affected. It is therefore most preferred that the ends of the inserts are staggered and terminate within the range of 5% through 15% of the belt width. Additionally in the embodiment shown in FIG. 2B, it is also believed important that the turnup 32 extend at or slightly beyond the end of the insert 46.

Test tires were constructed using the constructions shown in FIG. 2B having the insert 46 for a single compound extending to the bead core and the prior art tire of FIG. 1. All the materials were the same excepting the combination apex 48 and the second ply 40 of the control tire were not used in the test tire which instead used the insert 42 and extended turnup 32.

The control tire was the prior art tire and the test tire is as shown in FIG. 2B. The tires were of a size P225/50R17 and a P245/50R17.

The results indicated that the test tire had slightly lower and therefore better rolling resistance, reduced weight, slightly improved handling, and substantially equal runflat performance relative to the control tires. The test tires of size P225/50R17 of FIG. 2B were run to 400 miles in lab testing without air with no signs of material degradation sufficient to cause tire collapsing. The P245/50R17 tire lab data runflat testing indicated a mileage of about 110 miles which is substantially the same as the control tire. Clearly the inventive tire could be further reduced in weight. The resultant effect was the tire is an acceptable substitute at substantially less cost to manufacture.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a section height (SH), a tread, a belt structure and a carcass radially inward of the tread and the belt structure, the carcass comprising:
    a pair of sidewall portions;
    a pair of bead regions;
    a pair of inextensible bead cores, one bead core being in each bead region;
    a single ply extending from bead core to the opposite bead core, the single ply being reinforced by cords and having a pair of turnups, each turnup being wrapped about a bead core and extending radially outwardly to an end, the end being at a radial height of at least 40% of the tire section height (SH);
    a pair of first runflat inserts, one first runflat insert lying radially inward of the ply in each sidewall portion; and
    a pair of second bead filler runflat inserts, one second bead filler runflat insert being radially above each bead core and interposed between the ply and the turnup in each sidewall portion, the turnup being spaced from the ply by the bead filler runflat insert in each sidewall portion.

2. The tire of claim 1 wherein the first runflat inserts and the second bead filler runflat inserts are elastomeric and have radially outer ends lying under the belt structure.

3. The tire of claim 2 wherein the elastomeric second bead filler runflat inserts further comprise short fibers embedded in the second bead filler runflat insert.

4. The tire of claim 2 wherein the elastomeric second bead filler runflat inserts further comprise reinforcing cords.

5. The tire of claim 4 wherein the cords of the at least one ply have a modulus E different from the cords of the second bead filler runflat inserts.

6. The tire of claim 1 further comprising at least one bias cord reinforced member located between the ply and the turnup wrapped around the bead core and extending radially outwardly on each side of the bead filler runflat insert in each bead region.

7. The tire of claim 1 further comprising at least one cord reinforced member located between the bead filler runflat insert and the turnup in each bead region.

* * * * *